Nov. 24, 1959 — J. L. ROLSTONE — 2,913,849
FISHING LURE
Filed Feb. 26, 1958

INVENTOR.
JOHN LEONARD ROLSTONE
BY
Harold E. Stonebraker
HIS ATTORNEY

United States Patent Office 2,913,849
Patented Nov. 24, 1959

2,913,849

FISHING LURE

John Leonard Rolstone, Rochester, N.Y.

Application February 26, 1958, Serial No. 717,745

3 Claims. (Cl. 43—42.41)

This invention relates to a fishing lure or plug and has for its purpose to afford a lure that can be used for trolling or casting without danger of the hooks becoming entangled in weeds or other obstructions as the device is drawn through the water.

Conventional lures and plugs are usually satisfactory and successful when operating in deep water, but if employed in shallow water or close to shore, they are likely to become snarled and the invention provides an economical, simple, and effective structure that eliminates the possibility of losing a fish or line as a result of a hook becoming snagged in weeds, or on rocks, tree stumps, or other obstructions.

A further purpose of the invention is to provide a structure that can be economically manufactured and operates automatically to prevent the hooks catching on to weeds or other obstructions, while at the same time not interfering with the normal operation of the hooks in catching and securely holding a fish.

To these and other ends, the invention consists in the construction and arrangement of parts that will appear clearly from the following description when read in conjunction with the accompanying drawings, the novel features being pointed out in the claims following the specification.

Figure 1:
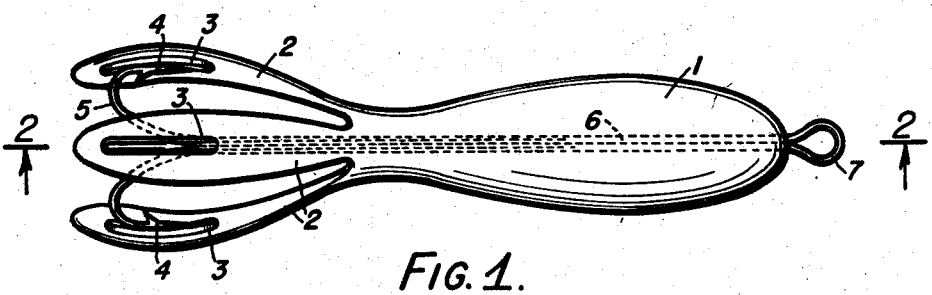
Fig. 1 is a view in side elevation of a fishing lure constructed in accordance with one embodiment of the invention.
Figure 2:
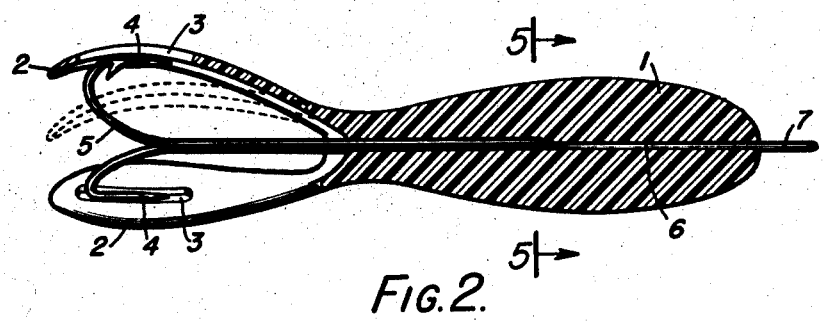
Fig. 2 is a longitudinal sectional view on line 2—2 of Fig. 1.
Figure 3:
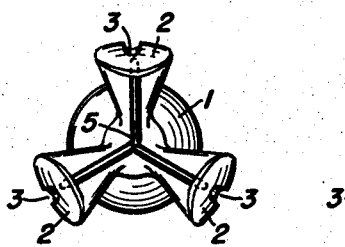
Fig. 3 is a view in end elevation looking from left to right of Fig. 1.
Figure 4:
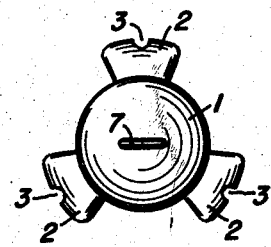
Fig. 4 is a view in end elevation looking from right to left of Fig. 1.
Figure 5:
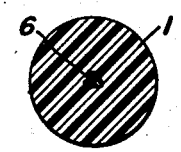
Fig. 5 is a transverse sectional view on line 5—5 of Fig. 2.

Referring more particularly to the drawings in which like reference numerals refer to the same parts throughout the several views, 1 designates the body portion of generally oval shape endwise and of circular cross-section, terminating at its outer end in a reduced portion or neck that merges into a series of guard portions 2 that are of relatively thin cross-section and formed integral with the body portion 1.

The body portion 1 and integral guard portions 2 are made from a material that imparts flexibility to the guard portions whereby they can yield inwardly when compressed by a fish and return to their normal positions when released, and for this purpose are made from a suitable plastic material which is molded. The guard portions are connected to the body portion 1 by thin portions that permit the required flexibility, and are convex on their outer surfaces and concave on their inner surfaces, flaring away from the body portion outwardly and thence inwardly, in a reverse curve, and are spaced from each other circumferentially.

The guard portions 2 are curved both endwise and crosswise, and each is provided with a hook-receiving slot 3 adjacent to its outer end. The slot 3 in each guard portion 2 extends endwise and in alinement with the barb 4 of the hook 5 so that the barb can enter and extend outside the slot 3 when the guard portion is compressed. There are preferably three hooks 5, forming part of a conventional triple hook, fixed to or integral with a wire shank 6 which extends centrally through the body portion 1 and is fixedly anchored therein. The shank 6 at its inner end extends beyond the body portion 1, and has an eye 7 integral therewith to permit fastening the lure to the line.

In operation, the lure when moving through the water, if encountering any weeds or obstruction, is guided past such obstruction which is deflected by the convex guard portions which surround and protect the hooks. When a fish grabs around the guard portions, they are squeezed or compressed until they pass inwardly around the barbs which then enter the slots 3 and project outside the guard portions, permitting the barbs to enter and retain a portion of the mouth of the fish.

While the invention has been described with reference to the structure shown, it is not limited to the details disclosed herein, and this application is intended to cover such modifications or departures as may come within the purposes of the improvement or the scope of the following claims.

I claim:

1. A fish lure comprising a body portion consisting of plastic material and of circular cross-section, said body portion being of generally oval shape endwise and terminating at its rear end in a concave portion merging into a series of integral spaced leaf-like flexible guard portions, each of which is connected to the body portion by a portion having a relatively thin cross-section and is yieldable to move inwardly in relation to the body portion when compressed by a fish and to move outwardly to resume its normal position when released, each of said guard portions being curved endwise on its exterior surface and cross-wise and having a hook-receiving slot spaced from its outer end extending endwise, a wire shank extending centrally through the body portion and permanently embedded therein, an eye at the forward end of said shank adjacent to the body portion, the shank extending beyond the rear end of the body portion, a series of hooks rigidly attached to the rear end of said shank and each hook having a barb located inwardly of a guard portion, the barb being in alinement with the slot in the guard portion and operating to extend through and outwardly of the guard portion when the latter is compressed, the guard portion end of the lure being of greater diameter at its widest portion than the body portion.

2. A fish lure comprising a solid plastic body portion of circular cross-section, the body portion terminating at its outer end in a series of flexible circumferentially spaced leaf-like guard portions integral with and extending outwardly from the body portion, each of said guard portions having a hook-receiving slot spaced from its rear end, and a metal shank rigidly connected to the body portion and having a series of hooks connected thereto, each hook having a barb located inwardly of a slot in a guard portion and movable into and outwardly beyond the slot when the guard portion is compressed, the guard portion end of the lure being of greater diameter at its widest portion than the body portion.

3. A fish lure comprising a body portion of circular cross-section, a series of circumferentially spaced flexible leaf-like guard portions integrally connected to the rear end of the body portion by a portion having a relatively thin cross-section, each of said guard portions having a hook-receiving slot extending endwise, a plurality of hooks connected to said body portion, each hook located under one of said guard portions and including a barb in alinement with one of said slots, and an eye connected to the forward end of the body portion, the guard portion end of the lure being of greater diameter at its widest portion than the body portion.

References Cited in the file of this patent

UNITED STATES PATENTS

| | | |
|---|---|---|
| 539,149 | Shattuck | May 14, 1895 |
| 2,185,507 | Knapp | Jan. 2, 1940 |
| 2,590,461 | Rasch | Mar. 25, 1952 |
| 2,623,321 | Braukus | Dec. 30, 1952 |